(12) United States Patent
Rivailler

(10) Patent No.: US 6,273,340 B1
(45) Date of Patent: Aug. 14, 2001

(54) CODING METHOD, CODING EQUIPMENT AND RESULTING CODED PRODUCT

(75) Inventor: Jacques Rivailler, Magny-en-Hameaux (FR)

(73) Assignee: Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 09/308,951

(22) PCT Filed: Sep. 29, 1998

(86) PCT No.: PCT/FR98/02089

§ 371 Date: Jul. 19, 1999

§ 102(e) Date: Jul. 19, 1999

(87) PCT Pub. No.: WO99/17251

PCT Pub. Date: Apr. 8, 1999

(30) Foreign Application Priority Data

Sep. 30, 1997 (FR) .................................................. 97 12142

(51) Int. Cl.[7] .................................................. G06K 16/06
(52) U.S. Cl. ...................... 235/494; 235/456; 235/462.01
(58) Field of Search ..................................... 235/494, 456, 235/462.01, 375, 376

(56) References Cited

U.S. PATENT DOCUMENTS

| 3,991,300 | * | 11/1976 | Chadima, Jr. ...................... 235/61.12 |
| 4,998,010 | * | 3/1991 | Chandler et al. ..................... 235/494 |
| 5,126,542 | | 6/1992 | Priddy et al. ......................... 235/456 |
| 5,602,382 | | 2/1997 | Ulvr et al. ............................ 235/494 |

* cited by examiner

*Primary Examiner*—Karl D. Frech
*Assistant Examiner*—Daniel St. Cyr
(74) *Attorney, Agent, or Firm*—Jeffrey C. Lew

(57) ABSTRACT

A process for data coding on any type of support (object, document, plant, animal, any material or materialized surface) calling for affixing on a surface a marking constituted by a plurality of elementary signs belonging to at least two different types, the marking being broken down into a plurality of coding zones each corresponding to coded information of a different nature. At least one configuration zone has content specific to the type of application and determines a characteristic of at least one of the other zones.

8 Claims, 1 Drawing Sheet

CODING METHOD, CODING EQUIPMENT AND RESULTING CODED PRODUCT

FIELD OF THE INVENTION

The present invention relates to a process for marking a product, as well as to a process for identification of supports (any object, paper document, plants, animal, water) which uses said marking processes.

BACKGROUND OF THE INVENTION

The prior art in European patent No. 80400952.0 describes a process for printing text on a support sheet consisting in associating to each character, whatever its typography or enrichment, a sequence of numerically coded characters. These sequences of coded characters have no significance for the reader. In contrast, they can be re-transcribed into printing characters by a complementary machine comprising a camera capable of recognizing the coded information, associated with a computer printer of a known type, controlled by a computer which operates the decoding of the signals delivered by the camera.

The above process presents two advantages. The first is to allow inscription on any support, in particular a paper support, in a form which is condensed and easy to exploit using a computer for translation into legible characters. The second interest is to code the characters and provide security for the written information and for its transmission by cable or radio.

In contrast, the above process presents limitations since it is not compatible with the retranscription of graphical information, for example a signature or an image.

The prior art in U.S. Pat. No. 5,602,382 describes a particular bar code format, comprising an error correction zone of the REED-SOLOMON type. It is a "proprietary" format which is not adaptable. The DCI code of the identification zone simply allows designation of the postal coding system used.

The prior art processes can be described as involving the inscription on a support, for example a label, of an assembly of usually black or white pixels, having a generally rectangular, round or square shape. Printing defects can lead to partial covering of adjacent pixels, or to deformation of printed pixels, which lead to erroneous decoding of information.

It is also known to effect a coding using a bar code which is the subject of an international standardization. These bar codes are adapted for widely used applications, which require a consensus on the format of the code.

The objective of the present invention is to improve the reliability in the reading of information printed on a support, and conferring a wide flexibility in the coding configuration, while allowing reading and use of the code with a standard and universal equipment.

To this end, the invention relates in its broadest sense to a process for coding a product which consists in affixing on the surface of a product, or optionally an animal, a marking constituted by a plurality of elementary signs belonging to at least two different types, said marking being broken down into a plurality of coding zones each corresponding to a coded information of a different nature, characterized in that the marking comprises at least one zone of configuration Cp whose content is variable and specific for each range of products, the content of said configuration zone determining at least one characteristic of at least one of the other variable coding zones specific to a product of a given range.

According to a first variant, the marking comprises at least one configuration zone which determines the format of the other coding zones.

According to a second variant which is not exclusive from the first variant, the marking comprises at least one configuration zone which determines the attributes of the other coding zones.

Preferably, the configuration zone is an initiation zone located at the start of the marking.

According to a preferred embodiment, the marking comprises a security zone whose content is determined by the result of an encoding function applied to a descriptor of the marked product. This security zone makes it possible to verify the conformity of the marked product and the absence of substitution. This variant is particularly adapted to a security marking.

According to a preferred variant, the marking is effected in the form of a matrix of N columns and M elements notably binary.

According to a particular embodiment, the marking is effected in the form of modifications of a zone of an image whose dimensions are very much larger than the marking zone.

Advantageously, the marking is effected in the form of a plurality of zones $z_i$ each constituted by juxtaposition of at least one coding band $B(i)_j$, each of these coding bands being constituted by N juxtaposed pixels $P(i, j)_k$.

The invention also relates to equipment for coding a product comprising means for marking the surface of a product by affixing a marking constituted by a plurality of elementary signs belonging to at least two different types, said marking being broken down into a plurality of coding zones each corresponding to a coded information of a different nature, characterized in that said equipment comprises a computer for affixing at least one configuration zone which determines at least one characteristic of at least one of the other coding zones.

BRIEF DESCRIPTION OF THE DRAWINGS

The invention will be better understood by reading the following description, which relates to a non-limiting example of an embodiment of the invention and by reference to the attached drawings where:

FIG. 1 represents a schematic view of a code sequence according to the invention.

Figure 1:
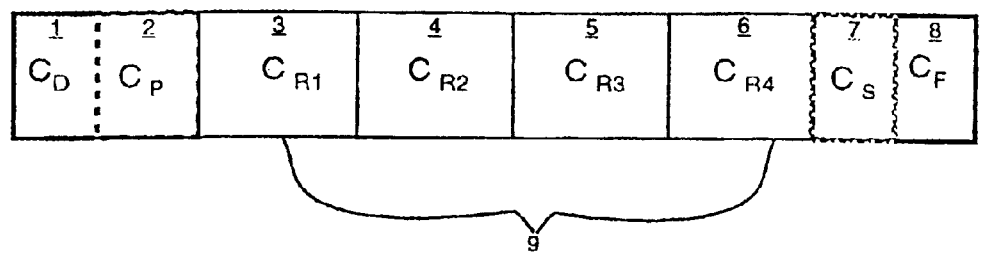
FIG. 1 represents a schematic view of a code according to the invention.

The invention finally relates to a coded product presenting on its surface a marking constituted by a plurality of elementary signs belonging to at least two different types, said marking being broken down into a plurality of coding zones each corresponding to a coded information of a different nature, characterized in that the marking comprises at least one configuration zone which determines at least one characteristic of at least one of the other coding zones.

DETAILED DESCRIPTION OF THE PREFERRED EMBODIMENTS

This sequence presents a structure which is configurable for each of the specific applications. The sequence comprises a first invariant part (1) which is the coding element $C_D$ at the start of the sequence, and a second invariant part (8) which is the coding element $C_F$ for the start and the end of the sequence. Preferably, these two parts $C_D$ and $C_F$ are asymmetric so as to allow reading of the sequence in the two directions to determine the reading direction in order to allow re-establishment of the original reading direction.

The sequence comprises in addition at least one configuration part $C_p$ (2) whose objective is to determine the composition of the remainder of the sequence.

Optionally, a second configuration part $C_{p'}$ can be provided which is complementary to part (2) before the coding part $C_F$ (8). It allows inverting the direction of interpretation of the body of the message.

The configuration parts determine the format (length, type and nature of the information) of the central part (9) constituting the body of the message, both with respect to the organization of the central part (9) and to its content.

The length of the central part (9) can be selected freely, and is determined by the content of the configuration parts $C_p$. This central part (9) can be single, or subdivided into a plurality of parts $C_{Ri}$ (3 to 6) of equal or unequal lengths.

The content and/or the length and/or the format of each of the parts $C_{Ri}$ (3 to 6) is determined as a function of the content of the configuration zone (2).

The configurable parts $C_{Ri}$ (3 to 6) can form a single field, bounded on either side by the parts for the start and the end of the coding, the absence of the configuration field $C_p$ being implicitly translated as the indication of a single central field (9).

It is possible to memorize a series of predefined formats which can be selected by standardized identifiers. These identifiers allow reduction in the length of the configuration fields $C_p$ and $C_{p'}$. The predefined formats can be memorized in a data base which is accessed by a translator, by direct or encrypted addressing, to determine the format of the body of the message (9).

When the central field (9) is subdivided into several configurable parts $C_{Ri}$ (3 to 6), the zones $C_p$ and $C_{p'}$ codify the length and significance of each of the zones, according to a universal coding for a family of definable codings.

Figure 2:
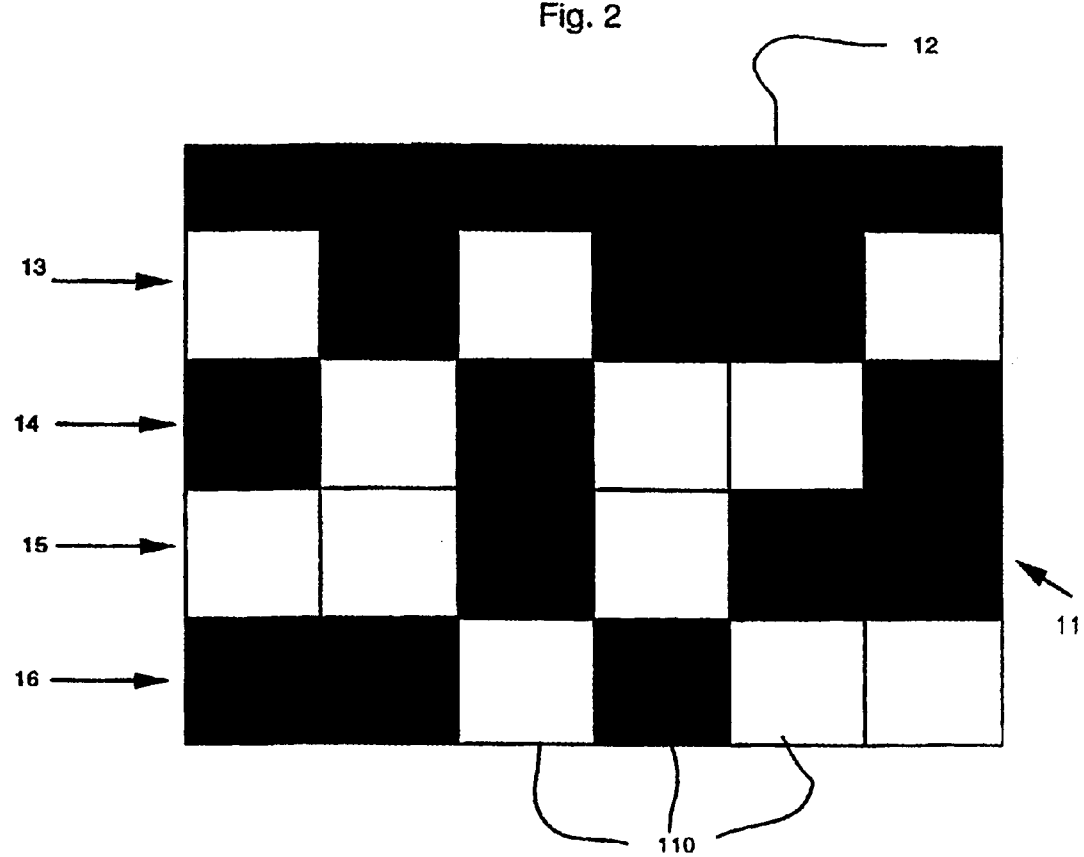
FIG. 2 represents an example of marking of a coded product according to the process which is the subject of the present invention.

FIG. 2 represents an example of a printed code by application of the process of the invention.

The code is in the form of a matrix (11) constituted by a plurality of binary black or white elements (110), having a rectangular shape in the example described.

The matrix is optionally preceded by a black band (12) which facilitates detection of the start of the code and correction of alignment errors.

The matrix (11) is constituted by a series of columns (13 to 16).

The columns of rank $2_n-1$, i.e. the first column (13) and the third column (15) are constituted by a series of binary elements corresponding to a coding known under the name "ECO" which allows coding of the 128 symbols of the ASCII standard in the form of words with 7 significant elements, plus one control character corresponding to the parity of the 7 significant elements, or a complete octet, i.e. 256 symbols if the parity element is used as the $8^{th}$ normal element (1 weight 2**8). This replacement of the parity element becomes more logical when a redundancy of the order 2 is available.

The columns of rank $2_n$, i.e. the second column (14) and the fourth column (16), are constituted by a series of binary elements each corresponding to the inverse of the element of the same rank in the preceding column.

Reading of the code is effected as follows:

The image is acquired using a CCD type camera. The image is memorized and optionally rotated using an image editing program. Rotating of the image is facilitated by the presence of a first column (12) constituted by a black band, which serves as a reference for rotation of the recorded image.

The digitized image is then analyzed so as to generate a matrix of binary values 1 or 0, errors in reading as well as degradation of the support leading to erroneous values. However, the degradations affecting one type of inscription, for example the black binary elements, are generally without effect on the inverse binary elements, in this case white, and vice-versa.

Thus, a change in the support which would cause an error in the reading of the black binary elements, would not necessarily affect the white binary elements. Treatment of the digitized image allows restoration of the original code due to the redundancy of information, and by taking this rule into account.

It is possible to provide an overlap of the columns in the matrix in order to reduce the erroneous sampling.

It is also possible to provide that the elements of symmetrical type be of different dimensions, in order to increase the security of their detection, or to provide elements of opposite types presenting different shapes, or different gray levels or different colors. In the last case, it is possible to define on a flat support a 3 or 4 dimensional matrix, the third dimension corresponding to the colors and the fourth dimension to the density.

There are multiple applications for the coding process of the invention.

A first application relates to the coding of drawings or images, for example for tattooing and identification. The drawings and images can furthermore be used in the data processing industry. Their representation in the memory or on the network poses the problem of universality of the base coding. It is of interest to relate this representation to a quasi-universally recognized and used coding, for example that in the ASCII tables. The invention consists, for this application, in optically analyzing a drawing by considering it to be composed of ECO characters such as those described with reference to FIG. 2, these characters being single and abutting along two perpendicular axes. Thus, the drawing is broken down into strips or columns of 8 matrices. These latter each correspond to an ECO character and can be described by an octet to represent the 256 possible configurations of a segment.

All the computer treatments, notably of correction, sealing or compression of the number of octets can be applied as a function of the level of security or of the quality of reproduction chosen. This method also makes it possible to represent on "paper" a drawing after various computer treatments, for verification or archiving, and to acquire it again optically. The manual corrections can then be taken into account. This method can be used to code texts, for example telexes, to allow security and confidentiality of the information, by sealing and encoding, without identifying the treated graphic elements such as alphanumeric characters and without the hazards of image displays resulting from re-acquired images. The multilevel drawings can be reproduced by breaking down the analysis into several passes (or layers), in as many times as there are bits to define the gray shades or colors.

A second application relates to providing security for checks. Fraud in the area of bank checks involves modification of the reference of the beneficiary (identity and/or account number), the references provided by the check printer (account number, check number, . . . ), the amount of the check, the support itself or the signature. The solution to this type of fraud provided by the process of the invention consists in:

- writing in ECO characters on the check, and optionally on documents which accompany it, the data which already exist in clear form. There is a double advantage in this solution. It allows for automatic verification of the validity and of the coherence of the data, at different levels of treatment. It makes it more difficult to modify the coding because of the fineness of the elementary points and of the calculations necessary to erase and re-write the coherence controls.
- in sealing the information written in ECO characters, using a numerical seal based on the totality or only a part of the information contained on the check.
- in defining a positioning and writing format which allows secure use of the information.
- in defining the indexing ECO characters whose presence indicate the meaning of the subsequent ECO characters.

According to a specific application, at least certain of the initial zones $C_D$, $C_p$ and $C_{R1}$ are significant zones comprising low density information which can be exploited with low definition reading means.

According to another variant, the code comprises, in addition, between one of the zones $C_D$, $C_p$ or $C_{R1}$ and the adjacent zone a zone $C_A$ containing information constituting the public key associated to an encoding system where the zone $C_p$ designates the type.

The invention is described in the preceding as a non-limiting example. It is understood that those skilled in the art can effect various variants without going outside the scope of the invention.

What is claimed is:

1. A process for coding information comprising
  (a) providing an object bearing unencoded information,
  (b) providing a numerical seal,
  (c) processing at least a portion of the unencoded information with an encoding function using the numerical seal as a key to produce encoded information, and
  (d) affixing on the object a marking constituted by a plurality of elementary signs belonging to at least two different types, the signs being grouped in coding zones in the form of a matrix of elements arranged in a series of columns, each zone corresponding to coded information different from other coding zones, in which the marking comprises (i) at least one configuration zone containing coded information specific for a type of object on which the marking is affixed and determining at least one characteristic of at least one of the coding zones other than the configuration zone, and (ii) a central field zone containing the encoded information produced from the unencoded information and the numerical seal.

2. The process of claim 1 in which the numerical seal is based on at least a part of the unencoded information.

3. The process of claim 2 in which the numerical seal is based on all of the unencoded information.

4. The process of claim 1 in which the marking further comprises a zone corresponding to information consisting of a public key associated to an encoding function.

5. The process of claim 1 in which the unencoded information consists of an image and the processing step further comprises breaking the image into strips and analyzing the strips as ECO characters.

6. The process of claim 1 in which the unencoded information consists of writing on a check.

7. The process of claim 1 in which the elements are defined by optical characteristics selected from the group consisting of black and white binary, color, optical density and a combination thereof.

8. The process of claim 7 in which the matrix comprises odd ranked columns of black and white binary elements and even ranked columns of black and white binary elements corresponding to the inverse of the element in the preceding column.

* * * * *